United States Patent
Toombs

(10) Patent No.: US 7,638,068 B1
(45) Date of Patent: Dec. 29, 2009

(54) COGENERATION SYSTEM FOR GREASE SEPARATION AND POWER PRODUCTION

(76) Inventor: Alvin Edwin Toombs, P.O. Box 33, Phippsburg, ME (US) 04562

( * ) Notice: Subject to any disclaimer, the term of this patent is extended or adjusted under 35 U.S.C. 154(b) by 678 days.

(21) Appl. No.: 11/390,674

(22) Filed: Mar. 28, 2006

(51) Int. Cl.
C02F 1/02 (2006.01)
F02C 3/00 (2006.01)

(52) U.S. Cl. ............... 210/770; 44/589; 44/629; 210/773; 210/774; 210/787; 210/806; 60/461; 60/772

(58) Field of Classification Search ........ 44/589, 44/602, 628, 629; 165/41, 104.11, 138; 210/175, 210/182, 259, 512.1, 773, 774, 787, 788, 210/806, 768, 770, 804; 60/39.01, 39.461, 60/772
See application file for complete search history.

(56) References Cited

U.S. PATENT DOCUMENTS

| | | | |
|---|---|---|---|
| 3,769,207 A | 10/1973 | Baer | |
| 4,113,617 A | 9/1978 | Bereskin | |
| 4,378,229 A * | 3/1983 | Leen | 44/300 |
| 4,405,332 A * | 9/1983 | Rodriguez et al. | 44/280 |
| 5,433,846 A * | 7/1995 | Roshanravan | 210/195.1 |
| 5,457,951 A | 10/1995 | Johnson | |
| 5,637,221 A | 6/1997 | Coyne | |
| 6,286,313 B1 | 9/2001 | Heaf | |
| 6,372,129 B1 | 4/2002 | Moody | |
| 6,558,550 B1 * | 5/2003 | Kelly | 210/609 |
| 6,790,355 B2 | 9/2004 | Shaffer | |
| 7,485,230 B2 * | 2/2009 | Magner et al. | 210/603 |
| 7,507,846 B2 * | 3/2009 | Pelly | 554/170 |
| 2009/0062581 A1 * | 3/2009 | Appel et al. | 585/241 |

FOREIGN PATENT DOCUMENTS

WO    WO 03/089557    * 10/2003

OTHER PUBLICATIONS

From the Fryer to the Fuel Tank, Chapter 9, "How to Run a Diesel on Straight Vegetable Oil", Joshua and Kaia Tickell, Green Teach Publishing, ISBN 0-9664616-1-4.

* cited by examiner

Primary Examiner—Joseph W Drodge

(57) ABSTRACT

A cogeneration process and system which provides for the reclamation of a grease fuel from a concentrated grease trap pumping waste stream and the use of said grease fuel in a compression ignition reciprocating engine for the production of electric power. The concentrated grease trap pumpings are heated and mixed in the first stage of the process to ensure all grease is liquefied. This warm mixed stream is then separated by centrifuge into a heavy stream consisting of water and sediments and an oil-rich stream consisting of oil, grease/water emulsion and residual water. This oil-rich mixture is heated sufficiently to evaporate the residual water as well as the water of emulsion yielding a water free grease fuel suitable for use in the compression ignition engine. Heat energy for grease liquefaction and emulsion breaking is supplied by an engine jacket water cooling circuit and an exhaust heat recovery, respectively.

7 Claims, 1 Drawing Sheet

COGENERATION SYSTEM FOR GREASE SEPARATION AND POWER PRODUCTION

CROSS REFERENCE TO RELATED APPLICATION

None

FEDERALLY SPONSORED RESEARCH

None

SEQUENCE LISTING

None

FIELD OF THE INVENTION

This invention relates to a cogeneration system for recovering grease from a waste water stream and producing electric power and process heat with a reciprocating engine generator using the recovered grease as fuel.

BACKGROUND OF THE INVENTION

The wastewaters produced from restaurants and other large scale food processing facilities inherently contain large amounts of fats, oils and greases (this is often referred to as FOG and the general waste stream is often referred to as Brown Grease). Wastewater discharges from such facilities must be via a grease trap prior to release to public waste water streams. These grease traps are essentially crude gravity separation devices that prevent carryover of FOG to the public sewer. These traps work reasonably well provided that they are pumped out regularly. This pumping is typically performed using a vacuum truck similar to that used for septic tank pump-out. Disposal of this Brown Grease is difficult and is the subject of this invention. Somewhat similar but less troublesome is the waste grease from deep fat fryer operation. This is usually referred to as "Yellow Grease" and currently has sufficient commercial value that it is not ordinarily disposed of in the grease traps but rather is sold to entities that will remove it from the premises.

Brown Grease typically contains a variety of particulate matter in addition to water and fats, oils, and grease (FOG). Brown Grease accounts for about 300 million gallons of waste per year in the United States and contains from 1 to 5 percent grease. Brown Grease presents a difficult disposal problem in that it is not easily separated into a usable product and if not carefully handled it can upset of normal water treatment processes. The most general utilized disposal method is to reduce the volume by allowing some gravity settling period after which much of the water may be removed. This water may be disposal of my means ordinarily used at a commercial water treatment plant. The concentrated grease trap pumpings ("concentrated" referring to the fact that a preliminary gravity separation has allowed for removal of much of the water originally contained in the pumpings) would be treated by one of the following methods:

1. Adding chemicals to partially solidify the grease into a gel which would be incorporated into a composting operation or simply buried in a landfill, or
2. Biologically degrading the material.

Some attempts have been made to more completely separate the FOG from the concentrated grease trap pumpings by heating the incoming material and allowing gravity to more completely separate the liquid grease and water—in some cases, augmented by use of centrifugal separators. While further reducing the water content, this approach has not produced an economically useful product because of the high degree of emulsification of the incoming grease trap pumpings. This emulsification is predominately chemical in nature due to the extensive use of detergents in the cleaning process that produced the grease trap wastes and is very resistant to gravity or mechanical separation methods. A classical method for breaking such emulsions would be to perform chemical analysis to determine the best demulsifying chemical and to treat the waste stream accordingly. However, since there is wide variation in cleaning practices that produced the grease trap waste, this is both time consuming and expensive in an operating water treatment facility.

This invention overcomes the problem by reducing the waste grease stream to a concentrated grease/water mixture and then using the relatively high temperature waste heat available in the engine exhaust to heat the mixture and evaporate all the water in the emulsion. The first stage heating in the process serves to liquefy all of the grease contained in the waste grease stream. The centrifugal separation then further concentrates the waste grease stream to the point that sufficient heat is available in the engine exhaust to provide for complete evaporation of the water of emulsion plus any free water in a second heating stage. The resulting fluid (grease fuel) is a water free oil with some fine particulate material that can be readily filtered out prior to use as an engine fuel.

Compression ignition ("diesel") engines are widely used for production of electric power but are not normally capable of operation with fuels other than diesel fuel (or other hydrocarbon fuels with similar viscosity, cetane number and lubricating behavior) In order to use a non conventional fuel, the fuel must be treated in such a manner that the fuel characteristics are similar to the design basis diesel fuel or the engine fuel ignition system must be modified to allow for the variations. The grease fuel after having been heated and dewatered as described above is sufficiently close to diesel fuel in viscosity, cetane number and lubricity that no additional engine fuel injection system modifications are required.

PRIOR ART

In prior art, various attempts have been made to address this issue. U.S. Pat. Nos. 3,769,207 and 5,637,221 both present processes to separate emulsified and greasy materials from a wastewater stream while U.S. Pat. No. 4,113,617 presents an improved grease trap design but none of these provide a means for economically recovering the grease. U.S. Pat. No. 6,372,129 offers an improvement on the usual grease trap to be installed at a facility producing the waste steam that is effective in utilizing heat and waste heat in the process. U.S. Pat. No. 6,790,355 provides a means of biologically treating the FOG to remove it from the waste stream. U.S. Pat. No. 6,558,550 provides a method of chemically converting the FOG to a gel that can be incorporated into landfill material. The later three cases also fail to provide an economically useful method of utilizing the FOG. In general, prior art has focused on eliminating the FOG as a problem in the waste water treatment process and not on the potential economic value of the grease.

Some success has been had in converting Yellow Grease into useful fuels (biodiesel) by a process known as transesterfication which involves the conversion of the greases into methyl or ethyl esters and glycerin by treatment with alcohol and lye. This process requires careful assessment of the specific grease feedstock. It requires the use of supplemental chemicals and results in the formation of glycerin which is not generally a useful product. Presumably, once the grease fuel produced as a result of this invention is completely dewatered and filtered it could be converted in a similar process. However, this invention will allow for the direct use of the grease fuel in a diesel engine without the use of supplemental chemicals and will not produce additional byproduct wastes.

OBJECTS AND ADVANTAGES

Accordingly, several objects and advantages of the invention are:
a. Unlike past and current practice, the grease in the grease trap waste stream is reclaimed and significant economic value obtained by converting its energy value to electricity which can be used on-site or sold commercially.
b. The availability and use of abundant engine waste heat in the grease separation process allows the concentrated grease to be dewatered completely.
c. The use of heat to break the grease emulsion eliminates the need for and the disposal problems associated with chemical demulsifiers.
d. The availability of engine waste heat allows for heating of the grease fuel to reduce its viscosity enough to be used as a diesel engine fuel.

SUMMARY

The invention, a combined process for the recovery of a grease fuel from concentrated grease trap pumpings and production of electric power, embodies a method to overcome the limitations inherent in the use of recovered grease as a fuel for compression ignition engines and to use byproduct heat from the engine to provide the required process heat. The ability to utilize this fuel with a simple treatment—avoiding the cost of supplemental chemical treatment and the attendant byproduct disposal problem—by making use of the waste heat from the engine generator offers substantial cost advantages in dealing with this common waste stream.

Brown Grease in particular is a difficult waste stream to process. It is normally encountered in the form of a grease trap pumpings consisting of about 1-5% FOG materials (fats, oils and grease), with the remainder being water plus a variety of particulate residue (mostly dirt and solid food particles). The grease content in the pumping stream makes treatment at conventional water treatment facilities very difficult. The two stage heated separation process with the resulting grease fuel being used directly in a compression ignition engine is a simple, straightforward means of dealing with this problematic waste stream. The grease is completely incinerated in the engine and produces a beneficial byproduct (electricity) instead of a difficult and expensive disposal problem.

For the purposes of this invention, the grease trap pumpings have been pretreated in a water treatment plant to produce concentrated grease slurry that has had from about 40-80% of the water removed. This volumetric reduction is an ordinary practice in the water treatment industry today generally accomplished by simple gravity separation in a holding tank.

The invention consists of adding the concentrated grease trap pumpings to a grease slurry process tank where engine waste heat is used to warm the contents to liquefy all contained grease. The materials in this tank are mixed during the heating process and then passed through a centrifuge in order to separate the mixture into two parts. The heavy portion contains water and sediments that are sent to a water treatment plant for normal processing. The lighter portion (oil-rich stream) contains oil, oil/water emulsion and some residual water. This portion is sent to a grease fuel dewatering tank in which the material is heated to a temperature sufficient to evaporate all the contained water leaving a grease fuel that is suitable for use in a compression ignition engine.

Other than the care needed for startup and shutdown to allow for adequate heat-up of the grease fuel stream in the former and purging of the grease fuel in the later, operation of the engine generator set is similar to an engine operating with conventional diesel fuel.

Figure 1:
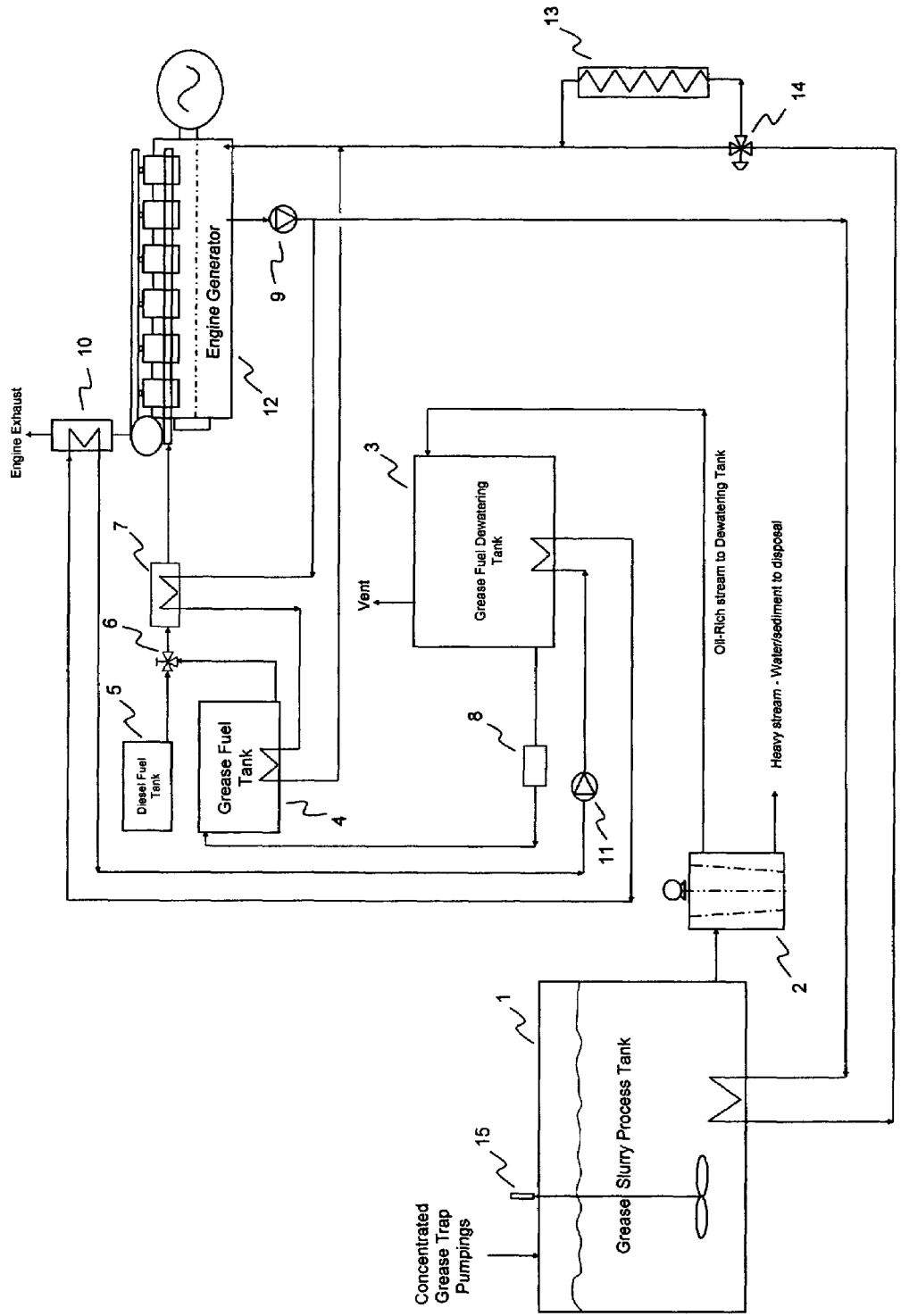
FIG. 1 is a process flow diagram of the preferred embodiment of the invention, a cogeneration system for grease separation and power production.

REFERENCE NUMERALS (1) Grease slurry process tank
(2) Centrifuge
(3) Grease fuel dewatering tank
(4) Grease Fuel tank
(5) Diesel fuel tank
(6) Fuel selector valve
(7) Fuel heater
(8) Grease fuel filter
(9) Jacket water pump
(10) Exhaust heat exchanger
(11) Exhaust heat exchange pump
(12) Engine generator
(13) Radiator
(14) Thermostat
(15) Mixer

DETAILED DESCRIPTION OF THE PREFERRED EMBODIMENT

FIG. 1 is a process flow diagram of the preferred embodiment of the invention: a cogeneration system for a grease separation and power production. Concentrated grease trap pumpings are added to a grease slurry process tank (1) where heat is added to the tank contents from the engine jacket water heating loop until the temperature of the tank's contents is sufficient to liquefy all grease matter. The tank contents are kept homogeneous by a mixer (15). Tank contents are drawn from the tank and sent to a centrifuge (2) in which process flow is split into a heavy stream containing water and sedimentary particles and a light stream containing oil, oil/water emulsion and some residual water. The heavy stream is sent to a conventional wastewater treatment system for disposal. The light (oil-rich) stream is sent to a grease fuel dewatering tank (3) where it is heated to a temperature greater than the boiling point of water by a process heating loop circulating a high temperature heat exchange fluid heated from an exhaust heat exchanger (10) which recovers heat energy from the engine generator exhaust. This heating process will evaporate any free water and water of emulsion contained in the oil-rich stream leaving a water free grease fuel and light sediment from the broken emulsion. This grease fuel is then sent via a grease fuel filter (8) to a grease fuel tank (4) and is ready for use as a fuel in an engine generator (12).

Fuel from a diesel fuel tank (5) would be used for starting and stopping the engine. A fuel selector valve (6) is used to switch to or from grease fuel or diesel fuel. A fuel heater (7) is used to maintain the grease fuel viscosity in a suitable range.

Water is taken from the engine jacket water system via a jacket water pump (9) in order to supply heating to the fuel heater (7), the grease fuel tank (4) and the grease slurry process tank (1) in that order. From the grease slurry process tank (1) the jacket water returns to the engine via a thermostat (14) from which some or all of the jacket water is diverted to a radiator (13) as needed to maintain engine temperature in the desired range.

In addition to the low temperature heating loop supplied by the jacket water circuit, higher temperature process heat is supplied by an exhaust heat recovery system. Engine exhaust is routed through the exhaust heat exchanger (10) in which the heat exchange fluid is heated to a temperature greater than the boiling point of water. The heat exchange fluid is sent to the grease fuel dewatering tank (3) to evaporate water from the oil-rich liquid in that tank. The heat exchange fluid is returned to the exhaust heat exchanger (10) via an exhaust HX pump (11).

OPERATION OF THE PREFERRED EMBODIMENT

For the preferred embodiment of the invention, operation is similar to other compression ignition generator sets. The engine is started and some load applied using conventional diesel fuel. Once the engine has achieved normal operating temperature and the grease fuel tank contents and engine fuel system have been heated up to operating temperature, the fuel selector valve (6) is shifted to take fuel from the grease fuel tank (4). Engine operation from this point is similar to what would be the case if the engine were operating on diesel fuel. The Brown Grease processing operation will require continual filling of the grease slurry process tank (1) with fresh concentrated unprocessed grease slurry as required to maintain a grease fuel supply to the engine. Alarms will be provided to alert the operator should water enter the fuel heater (7) or for high particulate loadings on the grease fuel filter (8).

Shutdown will require shifting the fuel selector valve (6) to operate the engine on diesel fuel in order to purge the engine fuel system of any residual grease fuel. Shutdown then would proceed as usual for diesel engine generator systems.

Having described my invention, what I now claimed is:

1. A method for producing electric power from concentrated grease trap pumpings which comprises:
    (a) heating said concentrated grease trap pumpings sufficiently to liquefy all contained grease,
    (b) separating the heated concentrated grease trap pumpings into;
        (1) a heavy stream comprising water and sediments, and
        (2) an oil-rich stream comprising oil, oil-water emulsion, and water,
    (c) heating said oil-rich stream sufficiently to evaporate contained water producing a grease fuel,
    (d) flowing said grease fuel to a grease fuel storage device,
    (e) flowing the stored grease fuel to an engine generator,
    (f) combusting the grease fuel in said engine generator whereby:
        (1) producing electric power,
        (2) heating a jacket water heat exchange fluid, and
        (3) producing a hot exhaust gas, and
    (g) placing the jacket water heat exchange fluid in a heat exchange relationship for the heating and liquefying of the concentrated grease trap pumpings.

2. The method of claim 1, which comprises: placing the jacket water heat exchange fluid in a heat exchange relationship with the contents of the grease fuel storage device.

3. The method of claim 2 which comprises: placing the jacket water heat exchange fluid in a heat exchange relationship with the grease fuel.

4. The method of claim 1, which comprises:
    (h) flowing the hot exhaust gas to an exhaust heat exchanger,
    (i) flowing a high temperature heat exchange fluid through the exhaust heat exchanger,
    (j) placing the hot exhaust gas in a heat exchange relationship with the high temperature heat exchange fluid, and
    (k) placing the high temperature heat exchange fluid in a heat exchange relationship with the oil-rich fluid.

5. The method of claim 4, wherein the high temperature heat exchange fluid is water.

6. The method of claim 1, which comprises: flowing the heated concentrated grease trap pumpings to a centrifuge whereby comprising, separating grease from the concentrated grease trap pumping stream and providing electric power production and whereby comprising, allowing treatment of the remaining portion of the concentrated grease trap pumping stream by conventional water treatment means.

7. An integrated system for producing electric power from concentrated grease trap pumpings which comprises:
    (a) a grease recovery system for converting said concentrated grease trap pumpings into a grease fuel, which system includes:
        (1) a grease slurry process device in heat exchange relationship with a jacket water heat exchange fluid thereby liquefying and heating the concentrated grease trap pumpings,
        (2) a means of flowing said heated concentrated grease trap pumpings from said grease slurry process device to a separating device for separating said heated concentrated grease trap pumpings into;
            (i) a heavy stream comprising water and sediments, and
            (ii) an oil-rich stream comprising oil, oil-water emulsion, and residual water,
        (3) a means of flowing said oil-rich stream from said separating device to a grease fuel dewatering device in heat exchange relationship with a high temperature heat exchange fluid for dewatering by evaporation said oil-rich stream thereby producing a grease fuel,
        (4) a means of flowing said heavy stream from said separating device to a disposal means, and
        (5) a means of flowing said grease fuel from said dewatering device to a grease fuel storage tank, and
    (b) a cogeneration system, which comprises:
        (1) an engine generator which comprises,
            (a) a means to produce electric power,
            (b) a means of producing a hot exhaust gas, and
            (c) a means of heating the jacket water heat exchange fluid,
        (2) a means of flowing the jacket water heat exchange fluid between the engine generator and the grease fuel storage tank,
        (3) a means of flowing the jacket water heat exchange fluid between the engine generator and the grease fuel heater,
        (4) a means of flowing the jacket water heat exchange fluid between the engine generator and the grease slurry process device,
        (5) an exhaust heat exchanger in heat exchange relationship with the high temperature heat exchange fluid,
        (6) a means of flowing exhaust gas through said exhaust heat exchanger, and (7) a means of flowing the high temperature heat exchange fluid between the exhaust heat exchanger and the grease fuel dewatering device, whereby, separating grease from the concentrated grease trap pumping stream and providing electric power production, and whereby, allowing treatment of the remaining portion of the concentrated grease trap pumping stream by water treatment means.

* * * * *